United States Patent [19]

Breimesser et al.

[11] Patent Number: 5,622,177

[45] Date of Patent: Apr. 22, 1997

[54] ULTRASOUND IMAGING SYSTEM HAVING A REDUCED NUMBER OF LINES BETWEEN THE BASE UNIT AND THE PROBE

[75] Inventors: Fritz Breimesser, Nürnberg; Bernd Granz, Oberasbach; Ralph Oppelt, Uttenreuth; Horst Siebold, Effeltrich, all of Germany

[73] Assignee: Siemens Aktiengesellschaft, Munich, Germany

[21] Appl. No.: 569,189

[22] PCT Filed: Jul. 6, 1994

[86] PCT No.: PCT/DE94/00777

§ 371 Date: Dec. 26, 1995

§ 102(e) Date: Dec. 26, 1995

[87] PCT Pub. No.: WO95/02197

PCT Pub. Date: Jan. 19, 1995

[30] Foreign Application Priority Data

Jul. 8, 1993 [DE] Germany .......................... 43 22 836.4

[51] Int. Cl.$^6$ ..................................................... A61B 8/14
[52] U.S. Cl. ................. 128/662.06; 128/662.03; 128/661.01
[58] Field of Search ......................... 128/662.03, 662.06, 128/661.01

[56] References Cited

U.S. PATENT DOCUMENTS

| | | | |
|---|---|---|---|
| 4,641,660 | 2/1987 | Bele | 128/661.01 |
| 4,945,915 | 8/1990 | Nagasaki | 128/660.07 |
| 5,014,711 | 5/1991 | Nagasaki | 128/660.07 |
| 5,186,175 | 2/1993 | Hirama et al. | 128/661.01 |
| 5,226,847 | 7/1993 | Thomas, III et al. | 128/662.06 |

FOREIGN PATENT DOCUMENTS

| | | |
|---|---|---|
| 0430450 | 6/1991 | European Pat. Off. . |
| 3130875 | 3/1983 | Germany . |
| 3048527 | 2/1984 | Germany . |
| 3805268 | 9/1988 | Germany . |
| 4209394 | 10/1992 | Germany . |
| WO89/04142 | 5/1989 | WIPO . |

OTHER PUBLICATIONS

IEEE Transactions on Ultrasonics, Ferroelectrics, and Frequency Control, vol. 38, No. 2, Mar. 1991; pp. 109–115, Olaf T. von Ramm et al.: *High–Speed Ultrasound Volumetric Imaging System—Part II: Parallel Processing and Image Display.*

Integrated Acoustic Array and Acoustical Holography, vol. 7, Kessler (Ed.), Plenum Press, pp. 422–445.

Meinke, Gundlach: *Taschenbuch der Hochfre-uenztechnik,* Springer–Verlag, Berlin, DE, 5th Revised Edition, K. Lange et al., pp. 051–054, R1 & R2.

American Association of Physicists Conference, San Antonio, Texas, Aug. 3–7, 1975, M.G. Maginness et al.: *State–of–the–Art in Two–Dimensional Ultra–sonic Transducer Array Technology.*

1980 Ultrasonics Symposium Proceedings, IEEE Group on Sonics & Ultrasonics, Nov. 5–7, 1980, Boston, MA, vol. 1, pp. 766–769.

Annual International Conference of the IEE Engineering in Medicine and Biology Society, vol. 13, No. 1, 1991, pp. 133–135, Gregg E. Trahey et al.: *A System for High Resolution Ultrasonic Breast Imaging.*

(List continued on next page.)

Primary Examiner—Marvin M. Lateef
Assistant Examiner—Derrick Fields
Attorney, Agent, or Firm—Kenyon & Kenyon

[57] ABSTRACT

An ultrasound imaging system has a probe containing a 2-D array of transducer elements and a base unit for the phase-delayed driving of the transducer elements of the array. Transmit pulsers digitally controlled by the base unit are provided for the transducer elements in the probe, and an address decoder is provided for the transmitting state, and a multiplexer for the ultrasonic signals in the receiving state. For the transmitting state, the probe and the base unit are interconnected via digital control lines and, for the receiving state, via a number of signal lines that is reduced by the multiplexer factor of the multiplexer.

13 Claims, 2 Drawing Sheets

OTHER PUBLICATIONS

IEEE Transactions on Ultrasonics, Ferroelectrics, and Frequency Control, vol. 38, No. 2, Mar. 1991, Stephen W. Smith et al.: *High–Speed Ultrasound Volumetric Imaging System—Part I: Transducer Design and Beam Steering,* pp. 100–108.

Ultrasonic Imaging, vol. 14, 1992, Academic Press, Inc., pp. 213–233, S. W. Smith et al.: *Two–Dimensional Arrays for Medical Ultrasound.*

ULTRASOUND IMAGING SYSTEM HAVING A REDUCED NUMBER OF LINES BETWEEN THE BASE UNIT AND THE PROBE

BACKGROUND OF THE INVENTION

The invention relates to an ultrasound imaging system, and more particularly to an ultrasound imaging system having a reduced number of lines between the base unit and the probe. Ultrasound imaging systems are known, e.g., from "IEEE Transactions on Ultrasonics, Ferroelectrics and Frequency Control", vol. 38, no. 2, March 1991, pp. 100–108.

In medical ultrasonic diagnosis, a volumetric area of the human body is irradiated with ultrasonic pulses and, from the reflected ultrasonic echo pulses, a signal processing unit constructs an ultrasound image which corresponds to a two-dimensional (2-D) section through the body. In known methods heretofore, to transmit and receive the ultrasonic pulses, linear arrays of piezoelectric transducer elements are generally used. The transducer elements are driven by an electronic control unit with preselected phase delays. Such phase-delayed linear arrays enable the transmitting and receiving of ultrasonic beams that can be steered and focused in a plane fixed from the normal to the array surface and the longitudinal direction of the array. The steering angle for the ultrasonic beam measured relative to the normal increases as the distance between the transducer elements becomes smaller. This interelement spacing is generally selected to approximately equal half of the wavelength of the ultrasound, to avoid additional diffraction patterns and, given a diagnostic frequency of 3.5 MHZ, amounts, for example, to about 0.2 mm. On the other hand, a certain minimum length of the linear array is necessary to achieve an adequate acoustic amplitude and an exact focusing of the beam. From these two requirements of the maximum distance of the transducer elements and the minimum length of the array, follows a minimum number of typically 64 transducer elements for the array.

Besides the known 2-D sectional images described above, three-dimensional (3-D) ultrasonic images are especially valuable for diagnostic medicine, because they enable dynamic structures, such as the flow of blood in the heart or in blood vessels to be depicted in real time. 3-D ultrasonic imaging systems are known having a 2-D transducer array, which is constructed as an N×M matrix from individual, generally square transducer elements. If these transducer elements are driven with properly selected phase delays, an ultrasonic beam can be produced and detected that can be steered and focused in two angular directions, in contrast to the one angular direction for linear arrays. To be able to scan a large enough solid-angle area with the ultrasonic beam, then analogously to the linear arrays, one must have a maximum interelement spacing of typically about 0.2 mm for the transducer elements and a minimum surface area of the 2-D array of typically about 20×20 mm$^2$, in the case of a square array, i.e., N=M. Consequently, a minimum number of transducer elements is also required for the 2-D array. One should preferably strive for a number of about 100×100= 10,000 transducer elements. Given such a large number of transducer elements and the required small dimensions, problems exist in the fabrication and contacting of the transducer elements and, in particular, by the number of control and data lines required to transmit the control signals and video signals.

Several 2-D ultrasonic transducer arrays for 3-D ultrasound imaging systems are known, which, however, are all composed of substantially fewer transducer elements, due at least in part to this problem.

In a known 2-D transducer array having 16×16=256 transducer elements, 96 elements are provided for transmitting and 32 elements for receiving ultrasound, and the remaining 128 transducer elements are not connected ("Ultrasonic Imaging", vol. 14, pp. 213–233, 1992, Academic Press).

Another known ultrasound imaging system contains a 2-D transducer array with 32×32 transducer elements in a hand-held instrument, to which are allocated 32 channels with 32 transmit pulsers for controlling the phase of the transducer elements and 32 channels with 32 pre-amplifiers for amplifying the received ultrasonic echoes. Via 32 transmit channel lines and 32 receive channel lines, the transmit pulsers or the pre-amplifiers are connected to a control unit or a signal processing unit. The transducer elements are interconnected into groups, which are intended to be used either only for transmitting or only for receiving. Only elements interconnected by groups in the rows, columns, or diagonals of the matrix can be controlled together or read out via the 32 transmit channels and the 32 receive channels. Thus, the ability to guide the ultrasonic beam through the solid angle is considerably curtailed ("IEEE Transactions on Ultrasonics, Ferroelectrics and Frequency Control", vol. 38, no. 2, March 1991, pp. 100–108).

SUMMARY OF THE INVENTION

In an effort to overcome the problems in the prior art, the present invention provides an ultrasound imaging system comprising a probe and a base unit. The probe contains a transducer array with a generally large number of transducer elements and is connected via a generally smaller number of control lines and signal lines to the base unit.

The present invention solves this problem by providing an ultrasound imaging system in which a digital control device is provided in the probe for transmitting purposes. The digital control device is connectable to each transducer element of the array. In this control device, a transmit pulser is allocated to each transducer element, and a shared address decoder for addressing the transmit pulses is allocated to these transmit pulsers. The address decoder is connected to the base unit via a number of address lines that are required for transmitting the digitally coded addresses. The transmit pulsers are connected to the base unit via a number of individual starting-time lines required for transmitting the digitally coded starting times for the transmit pulses. For receiving purposes, a multiplexer, which multiplexes a group of signals from various transducer elements on to one signal line in each case, is provided in the probe, and a demultiplexer for separating these signals following the transmission over the signal line is provided in the base unit. Thus, the number of control and signal lines can be considerably reduced.

BRIEF DESCRIPTION OF THE DRAWINGS

For further clarification of the invention, reference is made to the drawings.

DETAILED DESCRIPTION

Figure 1:
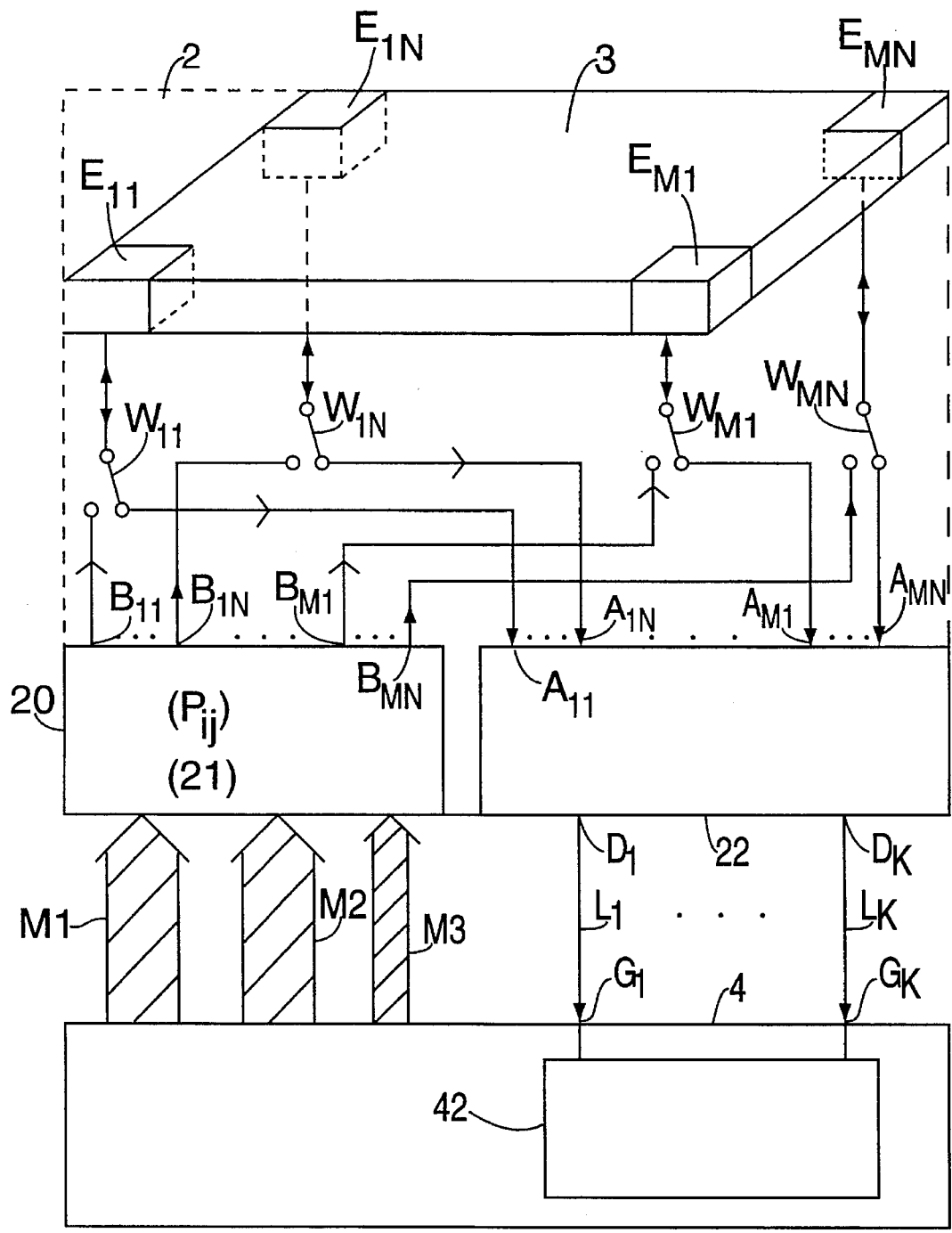
FIG. 1 is a schematic illustration of an ultrasound imaging system having a 2-D array in a probe and having a base unit.

In FIG. 1, a probe is denoted by 2; a two-dimensional array of transducer elements $E_{ij}$ preferably designed as an M×N matrix by 3; a base unit by 4; a digital control device in the probe 2 by 20; its control outputs that are connectable via separating filters (switches, duplexers) $W_{ij}$ in each case with a transducer element $E_{ij}$ by $B_{ij}$; a multiplexer in the probe 2 by 22; its signal inputs, which are connectable via the separating filters $W_{ij}$ in each case to a transducer element $E_{ij}$, by $A_{ij}$; and its signal outputs by $D_k$; starting time lines by M1; address lines by M2; other control lines by M3; a demultiplexer in the base unit 4 by 42; its signal inputs by $G_k$; as well as the signal lines connecting the signal outputs $D_k$ of the multiplexer 22 and the signal inputs $G_k$ of the demultiplexer 42 by $L_k$. The indices I, j and k are natural numbers where $1 \leq I \leq M$, $1 \leq j \leq N$ and $1 \leq k \leq K$ with specified natural numbers M, N and K.

In a transmit mode of the ultrasound imaging system, the transducer elements $E_{ij}$ are electrically connected via the separating filters $W_{ij}$ to the control outputs $B_{ij}$ of the control device 20. In the transmit mode, the control device 20 transmits transmit pulses for the transducer elements $E_{ij}$ with individually specified starting times $t_{ij}$. The control device 20 receives starting times $t_{ij}$ as digitally coded control signals via the starting time lines M1, and the addresses of the transducer elements $E_{ij}$ to be driven in each case as digitally coded control signals via the address lines M2. Preferably, binary coded control signals are provided. Besides the starting-time lines M1 and the address lines M2 as digital control lines, other control lines M3 from the base unit 4 to the control device 20 are preferably provided, by way of which the control device 20 is supplied with energy and with a clock pulse signal as a time reference for the transmit pulses.

The number m1 of the starting-time lines M1 is dependent upon the maximum time difference DT between the starting times $t_{ij}$ of all transducer elements $E_{ij}$ and the time resolution RT, which corresponds to the smallest time interval between the starting times $t_{ij}$ of two transducer elements $E_{ij}$. In the case of a binary coding of the starting time signals, the required number m1 of the starting time lines M1 is equal to $\log_2$ (DT/RT) when $\log_2$ (DT/RT) is an integer, and equal to the integral part of $\log_2$(DT/RT) added to the number 1 when $\log_2$ (DT/RT) is not an integer. The starting-time lines M1 can then be realized by an m1-bit data bus. For example, given a maximum time difference DT=10 μs and a time resolution RT=10 ns, a number of m1=10 starting time lines M1 is required.

In contrast to the number m1 of starting-time lines M1, the number m2 of address lines M2 is dependent upon the number of transducer elements $E_{ij}$. In the case of a binary representation of the addresses and given a square array 3 where M=N, this number m2 is, for example, equal to the integral part of the product $2*\log_2 N$ added to the number 1, when $2*\log_2 N$ is not an integer, and equal to $2*\log_2 N$ when $2*\log_2 N$ is an integer. Thus, for a square array 3 where $N^2=10000$ transducer elements $E_{ij}$, it suffices already to have m2=14 address lines M2.

To trigger the transducer elements $E_{ij}$, a transmit pulser $P_{ij}$, as well as an address decoder 21 for all transmit pulsers $P_{ij}$ for decoding the digital address signals are provided in the control device 20 for each transducer element $E_{ij}$. For the sake of clarity, the transmit pulsers $P_{ij}$ and the address decoder 21 are not shown in FIG. 1.

Figure 2:
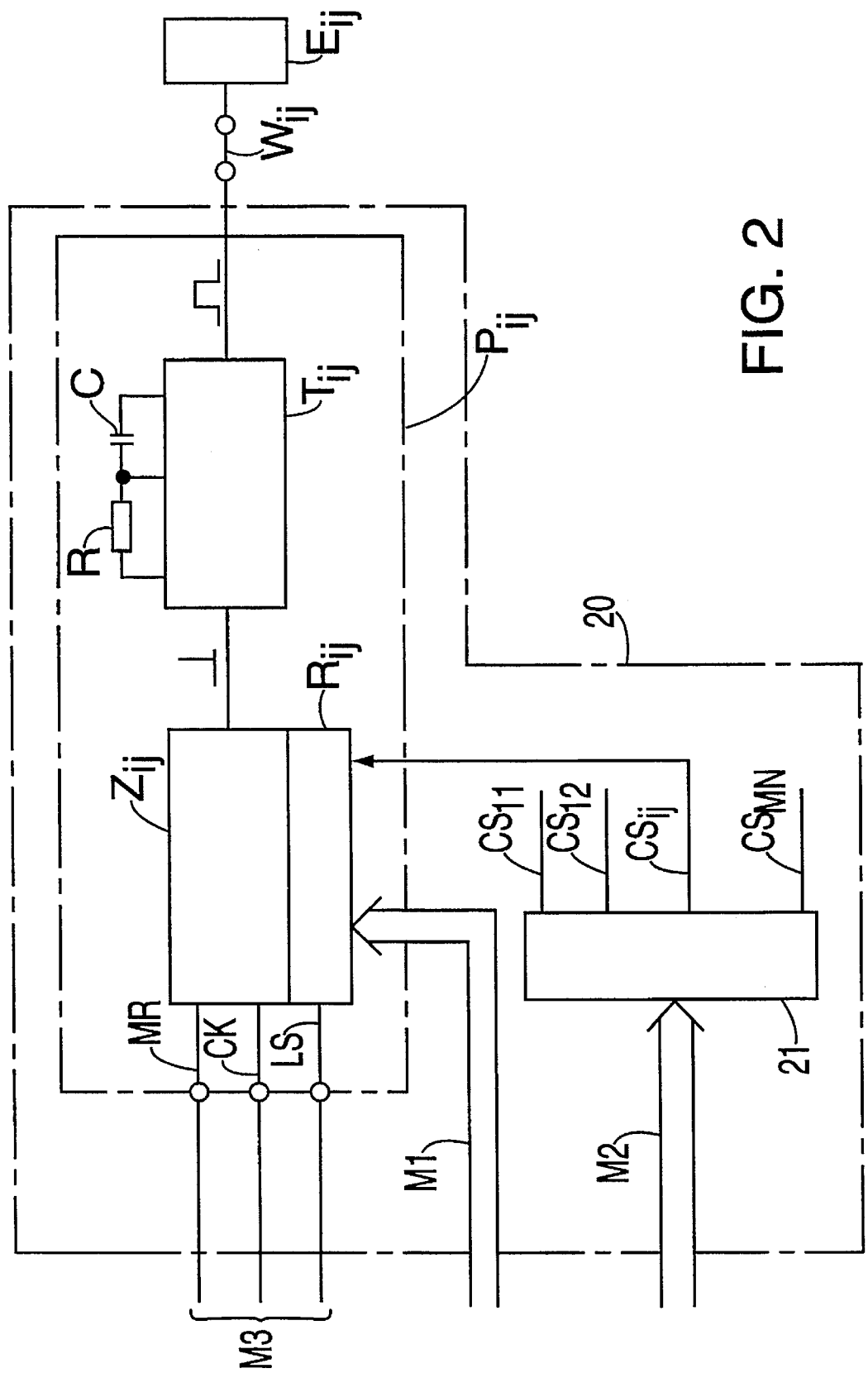
FIG. 2 is a diagram illustrating a control device for the transducer elements.

FIG. 2 shows a detail of an exemplary embodiment of the control device 20 provided for the transmit mode, including transmit pulsers $P_{ij}$ and an address decoder 21. Although only one transmit pulser $P_{ij}$ for an allocated transducer element $E_{ij}$ is illustrated, the remaining transmit pulsers $P_{ij}$ preferably have the same design. The address decoder 21 is electrically connected via the address lines M2 to the base unit 4 (not shown) and via a selector line $CS_{ij}$ to the transmit pulser $P_{ij}$. The selector lines for the remaining transmit pulsers are indicated graphically. The transmit pulser $P_{ij}$ is connected via the starting-time lines M1 and the other control lines M3 to the base unit 4, the lines contacting all transmit pulsers $P_{ij}$ in parallel. In the illustrated specific embodiment, three other control lines M3 are provided, via which the clock pulse signals (clock) CK, transfer signals (latch) LS or reset signals (master reset) MR can be transmitted.

In one embodiment, each transmit pulser $P_{ij}$ contains a programmable counter $Z_{ij}$, a storage register $R_{ij}$ connected to the counter $Z_{ij}$ and, preferably, also a flip-flop $T_{ij}$. The storage register $R_{ij}$ is activated via the allocated selector line $CS_{ij}$ and a transfer signal LS on one of the control lines M3 and is described by the value applied to the starting-time lines M1 for the starting time $t_{ij}$ of the transmit pulse. In the transmit mode, a clock pulse signal CK is applied with a preselected period to all counters $Z_{ij}$ of the transmit pulser $P_{ij}$. When the counter content of the counter $Z_{ij}$ conforms with the value for the starting time $t_{ij}$ stored in the storage register $R_{ij}$, the counter $Z_{ij}$ supplies a trigger signal (schematically drawn) for the flip-flop $T_{ij}$ connected between the transducer element $E_{ij}$ and the counter $Z_{ij}$. The flip-flop $T_{ij}$ then generates the actual, preferably square-wave transmit pulse (schematically depicted) with a defined length of time. A monostable element (monoflop) with a resistance-capacitance (RC) element can then be provided as a flip-flop $T_{ij}$. The trigger signal then forms the input edge of the transmit pulse.

In another embodiment, a D-flip-flop can be provided as a flip-flop $T_{ij}$. In this embodiment, the counter $Z_{ij}$ then supplies two trigger signals, which are fed with the help of an OR gate to a line and converted in the D-flip-flop into the actual transmit pulse. The two trigger signals then define the edges of the transmit pulse. The starting and stopping time of all transmit pulses are, thus, synchronized with the clock pulse signal, i.e., all transmit pulses have the same length.

In another embodiment (not shown), the clock pulse signal CK from the base unit 4 is divided by means of a frequency divider logic unit into four partial clock pulse signals that have one-fourth the frequency of the clock pulse signal CK and are offset from one another by a quarter period. This frequency divider logic unit is common to all transmit pulsers $P_{ij}$ and can also be arranged in the base unit 4. The partial clock pulse signals are then supplied to a 1-out-of-4 input selector. The output of this input selector is connected to the input of the programmable counter $Z_{ij}$. This measure allows the clock pulse frequency for the counter $Z_{ij}$ to be selected to be four times lower. By this means, the counting range of the counter $Z_{ij}$ can be reduced by a factor of 4, so that given a binary representation of the starting times $t_{ij}$, two bits less are needed for the starting times $t_{ij}$ (rough resolution). The two liberated bits of the starting-time lines M1 are now supplied to the 1-out-of-4 input selector to preselect the appropriate partial clock pulse signal (fine resolution).

For the receive mode of the ultrasound imaging system, the multiplexer 22 is provided in the probe 2 and the demultiplexer 42 is provided in the base unit 4. Through a multiplexing process, the multiplexer 22 feeds a group of ultrasonic signals from various transducer elements $E_{ij}$ to a signal output $D_k$, where $1 \leq k \leq K$. These signal outputs $D_k$ are connected via corresponding signal lines $L_k$ to corresponding signal inputs $G_k$ of the demultiplexer 42. The multiplexed ultrasonic signals are transmitted via the signal lines $L_k$ and resolved again in the demultiplexer 42 into individual signals. The demultiplexed individual signals can then be supplied in the base unit 4 to a signal processor, which can also contain an error correction.

Preferably, the same number F of ultrasonic signals from various transducer elements $E_{ij}$ is multiplexed on to each signal line $L_k$. This number F is also described as a multiplex factor. The number K of the required signal lines $L_k$ results then from the quotient of the number of transducer elements $E_{ij}$ and the multiplex factor F with the addition, possibly, of another signal line for the remainder of division. For example, in the case of an N×N array 3 with $N^2=10,000$ transducer elements $E_{ij}$ and a typical multiplex factor of F=16, only 625 signal lines $L_k$ are needed.

As a multiplexing process, one can also use known time multiplexing or also frequency multiplexing processes. Such multiplexing processes are known, for example, from Meinke, Gundlach: "Taschenbuch der Hochfrequenztechnik" (Handbook of High Frequency Engineering), 4th edition, Springer Publishers 1986, pp. 051–054 and R1–R2. Since the ultrasonic signals received from the transducer elements $E_{ij}$ have a band-pass character, the entire band width can be reduced in both multiplexing processes, preferably by means of spectral nesting.

Thus, the measures provided for the transmit mode and the receive mode substantially reduce the number of lines required between the probe 2 and the base unit 4 compared to an individual wiring of all transducer elements $E_{ij}$ to the base unit 4. For the transmit mode, only the digital control lines are still necessary, and for the receive mode, merely the multiplex signal lines are required. The number of control lines for the transmit mode is less, as a rule, than the number of lines for the receive mode. Typically, in the case of an ultrasound imaging system having 4096 transducer elements $E_{ij}$, given a sufficient time resolution, approximately 27 control lines M1, M2 and M3 are required and, given a multiplexing factor of 16, 256 signal lines are needed. In the case of the specified multiplexing factor, with an increasing number of transducer elements $E_{ij}$, the number of control lines becomes less consequential.

The starting times $t_{ij}$ for the next transmit phase can be transmitted during the receiving phase, because the control lines and the signal lines are independent of one another.

The transducer elements $E_{ij}$ can also be arranged in the array 3 differently than in the form of a matrix, for example, in a circular or rhombus shape.

Moreover, in place of the two-dimensional array 3, a one-dimensional array of transducer elements can also be provided, preferably a linear array. Such a one-dimensional array results, for example, as a special instance of the previously described M×N matrix arrays, in that one only selects one column or one row of the matrix array, i.e., either the number M=1 for the rows, or the number N=1 for the columns. The corresponding index I or j is then constantly equal to 1. Also, for a one-dimensional array, in accordance with the invention, the number of control and signal lines is reduced.

Piezoceramic or piezoelectric (e.g. PVDF) materials can be provided for the transducer elements $E_{ij}$. The transmit pulsers $P_{ij}$ can be manufactured, for example, using CMOS technology. Preferably, the transmit pulsers $P_{ij}$ and the transducer elements $E_{ij}$ are monolithically integrated in a substrate. For the phase-delayed control, corresponding delay elements are preferably provided in the base unit 4. Thus, the probe 2 remains comparatively light and easy to manipulate.

What is claimed is:

1. In an ultrasound imaging system, an imaging signal generating circuit comprising:
    a probe which includes:
        (a) an array of transducer elements that transmit an ultrasonic beam at an object of which an image is to be formed, in a transmit mode, and receive the ultrasound reflected by the object in a receive mode;
        (b) a control device which drives the transducer elements with transmit pulses at individually specified starting times in the transmit mode, said control device comprising an address decoder and, for each transducer element, a transmit pulser connected to the address decoder; and
        (c) a multiplexer which in the receive mode multiplexes groups of signals from said transducer elements and feeds each group of transducer signals to a corresponding signal output; and
    a base unit including a demultiplexer;
    wherein the address decoder is connected to the base unit via address lines for transmitting addresses of the transducer elements to be driven, and wherein the transmit pulsers are connected to the base unit via common starting-time lines for transmitting the starting-times for the transmit pulses, and wherein the signal outputs of the multiplexer and corresponding signal inputs of the demultiplexer are connected via corresponding signal lines that carry the corresponding groups of transducer signals.

2. The ultrasound imaging system according to claim 1, wherein the control device is connected via first and second control lines to the base unit, said first control line supplying energy to the control device and said second control line supplying a clock pulse signal to the control device as a time reference for the transmit pulses.

3. The ultrasound imaging system according to claim 1, wherein each transmit pulser contains a programmable counter and a storage register allocated to said counter for storing the starting times for the transmit pulses.

4. The ultrasound imaging system according to claim 3, wherein the control device is connected via first and second control lines to the base unit, said first control line supplying energy to the control device and said second control line supplying a clock pulse signal to the control device as a time reference for the transmit pulses.

5. The ultrasound imaging system according to claim 3, wherein the transmit pulsers and the transducer elements of the array are monolithically integrated.

6. The ultrasound imaging system according to claim 3, wherein the multiplexer is a frequency multiplexer and the demultiplexer is a frequency demultiplexer.

7. The ultrasound imaging system according to claim 3, wherein the multiplexer is a timing multiplexer and the demultiplexer is a timing demultiplexer.

8. The ultrasound imaging system according to claim 1, wherein the transmit pulsers and the transducer elements of the array are monolithically integrated.

9. The ultrasound imaging system according to claim 8, wherein the multiplexer is a frequency multiplexer and the demultiplexer is a frequency demultiplexer.

10. The ultrasound imaging system according to claim 8, wherein the multiplexer is a timing multiplexer and the demultiplexer is a timing demultiplexer.

11. The ultrasound imaging system according to claim 1, wherein the multiplexer is a frequency multiplexer and the demultiplexer is a frequency demultiplexer.

12. The ultrasound imaging system according to claim 1, wherein the multiplexer is a timing multiplexer and the demultiplexer is a timing demultiplexer.

13. An ultrasound imaging system for transmitting, in a transmit mode, an ultrasonic beam at an object of which an image is to be formed, and for receiving, in a receive mode, the ultrasound reflected by the object, in an ultrasound imaging system, an imaging signal generating circuit comprising:

- an array of transducers capable of transmitting the ultrasonic beam and receiving the ultrasound reflected by the object;
- a control device electrically connected via separating filters, in the transmit mode, to each transducer in the array of transducers; the control device having a transmit pulser for each transducer and having an address decoder which is connected to each of the transmit pulsers, the address decoder and the transmit pulsers being electrically interconnected via a plurality of selector lines;
- a multiplexer electrically connected via separating filters, in the receive mode, to each transducer in the array of transducers, wherein the multiplexer receives transducer signals representing the reflected ultrasound from the object;
- a base unit having a demultiplexer, wherein the base unit provides phase-delayed driving of the transducers during the transmit mode and provides signal processing of the transducer signals received from the transducers during the receive mode;
- a plurality of starting-time lines electrically connecting the base unit to the transmit pulsers, wherein the starting-time lines transmit starting times for transmit pulses;
- a plurality of signal lines electrically connecting the multiplexer and the demultiplexer, wherein the signal lines carry a group of transmitted multiplexed signals from the transducers; and
- at least one address line electrically connecting the address decoder to the base unit.

* * * * *